United States Patent Office 2,769,785
Patented Nov. 6, 1956

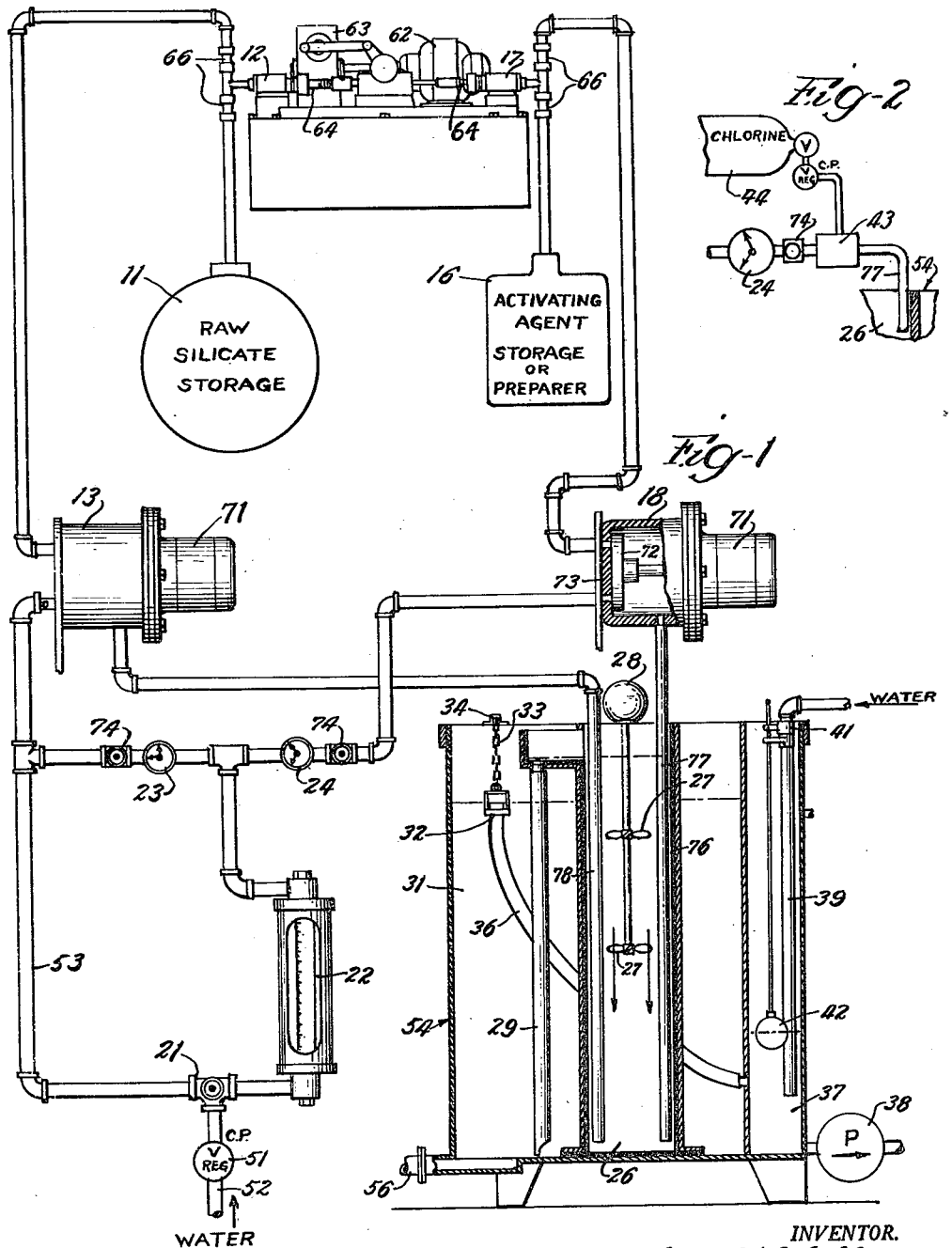

2,769,785

CONTINUOUS SILICA SOL APPARATUS

James D. Walker, Aurora, Ill., assignor to B-I-F Industries, Inc., Providence, R. I., a corporation of Rhode Island Application September 2, 1950, Serial No. 182,951

5 Claims. (Cl. 252—359)

Activated silica sol, sometimes called activated silica, is used in the clarification of water as a flocculation aid. It is usually added just before or after the coagulants or other floc-causing chemicals. It increases specific gravity and may aid settling further by reducing the feathery or lacy form of the floc.

Heretofore, when an activated or aged silica sol is required, it usually has been prepared by the batch process. Aging of a concentrated silica sol to activate it incidentally gives it a short gel time. The aging process is therefore quite delicate and has not heretofore seemed to lend itself satisfactorily to the more efficient continuous type of operation. A predetermined aging time is required, even though the feeding rate must be varied as the need for the sol varies. According to the present invention, the aged silica sol is nevertheless produced continuously with dependability and hence with resulting economy and with greater uniformity in the quality of the product as it is continuously mixed with the water to be treated.

The use of chlorine as the activating or neutralizing agent has had recognized advantages, because it also purifies the treated water. However, the continuous process with chlorine has been thought impossible. It is nevertheless accomplished by the present invention.

Additional objects and advantages of the invention will be apparent from the following description and from the drawings.

Designation of figures

Figure 1 is a largely diagrammatic illustration of one form of apparatus for practicing the invention. The various parts are not drawn to scale, the processing tank being drawn on a much smaller scale than most of the other parts.

Figure 2 is a diagrammatic view illustrating the use of chlorine.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description

In the illustrated apparatus, raw silicate is fed from a storage tank 11 by a pump 12 to a homogenizing mill 13. A suitable activating agent, if in liquid form, may be fed from a storage container 16 by pump 17 to a homogenizing mill 18. It is important that both the silicate and the activating agent be thoroughly mixed with suitable amounts of water and that the total amount of water present during aging be accurately controlled. To accomplish this, the water is directed by a three-way valve 21 to flow only through an accurate flow-measuring or measuring and regulating device 22. The water thus measured is divided accurately by micro-indicating valves 23 and 24 to control the proportions of water which are fed respectively to the silicate homogenizer 13 and to the activating agent homogenizer 18. Both of the homogenized mixtures are fed to the bottom of agitating tank 26, in which they are thoroughly mixed together by agitators 27, driven by motor 28. This final mixture at the top of the agitating chamber 26 overflows into a tube 29, which delivers it to the bottom of aging chamber 31.

In order that the resulting silica sol shall be well activated to act effectively in its ultimate purpose as a coagulant aid without danger of congealing because of its low gel time, it is important to be able to control the aging time independently of the rate of feed. This is accomplished by providing a vertically adjustable type of overflow draw-off 32. This draw-off may be raised or lowered by manipulation of chain 33, any link of which may be set in a lock 34. The links should be small for minute variations, or a screw device may be used. This is greatly preferred to a series of draw-off valves at different levels. The overflow device 32 is coupled by hose 36 with a discharge or makeup chamber 37. To keep the water in makeup chamber 37 low enough to draw the silica sol from any desired level in aging chamber 31, a discharge or booster pump 38 is provided, which delivers the sol to the water being treated. To maintain a sufficient body of liquid in the makeup chamber 37 for proper operation of the pump 38 and to dilute the silica sol enough to prevent coating of the pump, water is added to the makeup chamber 37 by pipe 39, controlled by valve 41 under influence of float 42.

Further details

To ensure uniform flow with a given valve setting, a constant pressure outlet valve 51 is provided in the water supply line 52. This permits the total rate of flow to homogenizers 13 and 18 to be controlled by setting valves 23 and 24.

The three-way valve 21 is provided as one convenient means of washing out the system when the production of silica sol is discontinued. It may be turned to direct the water through pipe 53 instead of through flowrator 22. This permits the water to flow at a relatively unrestricted rate through the homogenizer 13 and through the various chambers of the tank 54 to wash the silica sol therefrom. The tank 54 may be drained by an outlet 56, when desired. Instead of using the by-pass 53, the feed of silicate and activating agent may merely be discontinued.

The pumps 12 and 17 have been illustrated as part of a commercial feeding device, known as a proportioning pump. This device is driven by motor 62 which, through a gear box 63, oscillates piston rods 64 of the pumps 12 and 17. The pumps 12 and 17 are of the positive displacement types operating in conjunction with check valves 66 so that they deliver accurately measured quantities. The quantities delivered can preferably be independently varied by adjusting the length of the piston strokes.

Chlorine method

When chlorine is to be used as the activating agent, the indicator valve 24 may deliver water to a chlorinator diagrammatically represented at 43, and which may include a chlorinating jet. Chlorine gas is fed to this at a constant adjustable rate from tank 44. The chlorinator mixes the chlorine with the water well enough so that mixer 18 may be omitted.

Chlorinators require such large amounts of water that it has not seemed to be possible to divide the total water to be added between a silicate diluter and the chlorinator and have enough for both purposes. I have discovered, however, that with sufficient accuracy of division, it can just be done, this accuracy being attainable with the illustrated apparatus.

In one installation requiring 330 ml./min. of 41° Bé. raw sodium silicate, the use of 142 pounds of chlorine each 24 hours is recommended. This chlorine requires 3.2 G. P. M. (gallons per minute) of water flowing through the chlorinator. This leaves only .35 G. P. M. water for the mixer 13, but with thorough homogenizing this has been found to be enough. This total water of 3.55 G. P. M. results in 1% $SiO_2$ concentration, which appears to be proper concentration for the aging tank in this process. Much below 1%, activation will not occur, and much above 1%, there is not enough water to carry the chlorine.

In short, 90% of the total water added for aging is used for the chlorination and only 10% for diluting the silicate.

The activating agent may comprise, by way of example, any acid (sulphuric acid being common), chlorine, sodium bicarbonate, carbon dioxide, or ammonium sulphate. In the case of acids and other prepared liquids, the pump 17 may simply draw from a bottle or other container of this liquid. In the case of chlorine and carbon dioxide, the structure of Fig. 2 may be used. In the case of powdered or granular solids, such as ammonium sulphate and sodium bicarbonate, the element 16 may be deemed to represent a conventional device for preparing a slurry of such a substance. It is particularly in connection with such powdery substances that the homogenizer mill 18 is desired. When acids or other liquids readily mixing with water are used, a simple flow-mixing device may be substituted, such as a mixing T. The mixing T mixes the two liquids by a swirling or eddying action resulting from a restricted jet through which at least one of the substances is fed.

When a slurry mixer or other type of preparer is used, it may incorporate a measured discharge device, in which event the pump 17 may not be needed. The feed of raw silicate and of the activating agent must be accurately correlated, and the proportioning pump is one convenient way.

The homogenizing mills 13 and 18 may each be constructed approximately as illustrated in connection with the mill 18. Here a motor 71 drives a disk 72, which runs in close proximity to the end wall 73 of the mill through which the substances to be mixed are fed. Other violent agitation will suffice, however, as by a bladed impeller.

The micro-indicating valves 23 and 24 are commonly available as "indicating valves." They are capable of a very delicate and accurate setting, partly with the aid of geared pointers, one of which has relatively large movement for a slight change in the valve setting. Adjacent each indicating valve 23 and 24, a plug valve 74 may be provided, if desired, for shutting off the associated pipe when necessary.

The agitation chamber is preferably provided with a rubber lining 76 and the pipes 77 and 78, especially the former, are preferably of rubber. The agitators 27 and the shaft carrying them may be rubber or rubber coated. In place of the agitating chamber 26 there may, if desired, be substituted a homogenizing mill similar to homogenizers 13 and 18. It is important, however, that the silicate and activating agent first be thoroughly mixed or homogenized with suitable quantities of water. Indeed, with a homogenizing mill 13 for the silicate and the first water added to it, and with the indicated type of mixing for the activating agent, the mixing chamber of the type illustrated has been found to be entirely satisfactory. The sodium silicate used in the production of silica sol is commonly 41° Bé. and 42.2° Bé., in which the ratio of $Na_2O$ to $SiO_2$ equals 1 to 3.2.

The term "aged" as used herein means "activated."

I claim:

1. Apparatus for continuously producing aged ungelled silica sol, including tank means forming a mixing chamber, an aging chamber communicating therewith, and a makeup chamber, means for supplying raw sodium silicate at a known rate, means for mixing the sodium silicate with water supplied at a known rate, and delivering the mixture to the mixing chamber, means for supplying activating agent at a known rate, means for mixing it with water supplied at a known rate, and delivering the activating mixture to the mixing chamber, means for violently agitating the contents of the mixing chamber, means for supplying additional water to the makeup chamber to dilute the aged mixture flowing to it from the aging chamber, means to maintain the liquid level therein substantially below the liquid level in the mixing chamber, and draw-off means in the aging tank adjustable in height to control the liquid level therein and discharging into said makeup tank.

2. Apparatus for continuously producing aged ungelled silica sol, including a tank partitioned to form a mixing chamber, an aging chamber substantially larger than the mixing chamber, and a makeup chamber, feeding means for feeding predetermined amounts of raw sodium silicate and an activating agent, a homogenizing mill for homogenizing the fed sodium silicate with water, a second homogenizing mill for homogenizing the activating agent with water, means for feeding a measured supply of water, micro-indicating type valve means for dividing the fed water between the two homogenizing mills, means conducting the homogenized mixtures to the bottom of the mixing chamber, agitating means in the mixing chamber, overflow means connecting the top of the mixing chamber to the bottom of the aging chamber, an overflow type draw-off means positioned in the aging chamber with vertical adjustability and communicating with the makeup chamber for controlling the liquid level and hence the aging period in the aging chamber, draw-off means for drawing liquid from the makeup chamber at a rate in excess of the feed to the mixing chamber and means for supplying additional water to the makeup chamber to dilute the aged mixture flowing to it and to maintain a body of liquid therein at a level below that in the aging chamber.

3. Apparatus for continuously preparing silica sol having a short gel time, including a homogenizing mill, means for supplying water and an activating agent for sodium silicate, including comminuted particles, to the homogenizing mill, a rapid mixer, means for delivering the product of the homogenizing mill to the rapid mixer, a second homogenizing mill for homogenizing sodium silicate solution with water and delivering it to the rapid mixer, an aging tank through which the product of the rapid mixer flows, and means for diluting the mixture from the aging tank with more water.

4. Apparatus for continuously preparing silica sol having a short gel time, including a homogenizing mill, means for supplying water and an activating agent for sodium silicate, including comminuted particles, to the homogenizing mill, a rapid mixer, means for delivering the product of the homogenizing mill to the rapid mixer, a second homogenizing mill for homogenizing sodium silicate solution with water and delivering it to the rapid mixer, and an aging tank through which the product of the rapid mixer flows.

5. Apparatus for continuously producing aged ungelled silica sol including tank means forming a mixing chamber and an aging chamber communicating therewith, a homogenizing mill delivering to the mixing chamber, means for delivering sodium silicate to the homogenizing mill at a known rate, a constant pressure source of water, a micro-indicating valve for delivering water from said source to said homogenizing mill at a controlled rate, mixing means for mixing water with an activating agent for delivering water from said source to said mixing means at a controlled rate, means for violently agitating water in the mixing tank and means for drawing the resulting aged silica sol from the aging chamber.

References Cited in the file of this patent

UNITED STATES PATENTS

| | | |
|---|---|---|
| 556,939 | Rochemovitz | Mar. 24, 1896 |
| 1,943,487 | Ruth | Jan. 16, 1934 |
| 2,310,009 | Baker et al. | Feb. 2, 1943 |
| 2,444,774 | Hay | July 6, 1948 |
| 2,466,842 | Elston | Apr. 12, 1949 |
| 2,567,285 | Hay | Sept. 11, 1951 |